(12) United States Patent
Gibbons et al.

(10) Patent No.: US 8,960,616 B2
(45) Date of Patent: Feb. 24, 2015

(54) MOUNTING CLIPS AND DECORATIVE MOUNTING ARTICLES

(75) Inventors: Christopher J. Gibbons, Lincoln, DE (US); Jeffrey S. Gibbons, Lincoln, DE (US)

(73) Assignee: Gibbons Innovations, Inc., Lincoln, DE (US)

( * ) Notice: Subject to any disclaimer, the term of this patent is extended or adjusted under 35 U.S.C. 154(b) by 0 days.

(21) Appl. No.: 13/478,194

(22) Filed: May 23, 2012

(65) Prior Publication Data

US 2012/0298813 A1  Nov. 29, 2012

Related U.S. Application Data

(60) Provisional application No. 61/489,353, filed on May 24, 2011.

(51) Int. Cl.
| | |
|---|---|
| F16M 11/00 | (2006.01) |
| F16M 13/02 | (2006.01) |
| F21V 21/00 | (2006.01) |
| F21V 21/088 | (2006.01) |
| F21V 21/08 | (2006.01) |
| F16B 2/22 | (2006.01) |

(52) U.S. Cl.
CPC .............. *F16M 13/02* (2013.01); *F16M 13/022* (2013.01); *F21V 21/00* (2013.01); *F21V 21/088* (2013.01); *F21V 21/08* (2013.01); *F16B 2/22* (2013.01)
USPC ..... 248/201; 248/200; 248/205.1; 248/228.6; 248/316.7

(58) Field of Classification Search
USPC ........ 248/200, 205.1, 205.4, 211, 215, 218.4, 248/220.21, 220.22, 223.31, 225.21, 248/229.15, 229.2, 229.25, 228.6, 915, 248/316.7, 316.8; 29/525.08; 428/99; 24/546, 457, 336, 337, 341, 531; 138/118, 177; 362/147, 152, 249, 432, 362/806
See application file for complete search history.

(56) References Cited

U.S. PATENT DOCUMENTS

| | | | |
|---|---|---|---|
| 2,544,817 A | 3/1951 | White | |
| 2,599,303 A | 6/1952 | Ward | |
| 2,869,812 A * | 1/1959 | Hamel | ........................... 248/511 |
| 3,747,166 A * | 7/1973 | Eross | ............................... 248/75 |
| 3,800,370 A | 4/1974 | Courtright | |

(Continued)

OTHER PUBLICATIONS

Int'l Search Report and Written Opinion issued Jul. 24, 2014 in Int'l Application No. PCT/US2014/024107.

(Continued)

*Primary Examiner* — Terrell McKinnon
*Assistant Examiner* — Monica Millner
(74) *Attorney, Agent, or Firm* — Panitch Schwarze Belisario & Nadel LLP

(57) ABSTRACT

Mounting clips and decorative mounting articles removably engage to vertically disposed mounting surfaces, such as rain gutter downspouts. The mounting clips support arms, hooks, plates, decorations, and brackets for display of banners, flags, security lights, decorative lights, etc., on a downspout or other comparable mounting surface. The mounting clips include a frame having arms with projections separated by channels configured for attachment to a profiled outer surface of the mounting surface. Decorative mounting articles include a rear section forming channels having inner sidewalls with engagement portions configured for direct attachment of the decorative mounting article to a profiled outer surface of the mounting surface.

13 Claims, 9 Drawing Sheets

(56) References Cited

U.S. PATENT DOCUMENTS

| | | | |
|---|---|---|---|
| 3,983,602 A * | 10/1976 | Barry | 24/11 R |
| D257,948 S | 1/1981 | Klingensmith | |
| 4,406,434 A | 9/1983 | Schneckloth | |
| 4,452,836 A | 6/1984 | Daniel, Jr. | |
| 4,458,873 A | 7/1984 | Sutherland | |
| 4,624,431 A * | 11/1986 | Pfeifer | 248/215 |
| 4,844,121 A | 7/1989 | Duke | |
| 4,880,133 A * | 11/1989 | Cullinane | 220/737 |
| 4,903,929 A * | 2/1990 | Hoffman | 248/229.15 |
| 4,974,804 A | 12/1990 | Thompson et al. | |
| 4,991,803 A * | 2/1991 | Buder | 248/113 |
| 5,074,419 A * | 12/1991 | Smith | 211/17 |
| 5,188,318 A * | 2/1993 | Newcomer et al. | 248/68.1 |
| 5,388,377 A | 2/1995 | Faulkner | |
| 5,452,743 A | 9/1995 | Rortvedt | |
| 5,566,058 A * | 10/1996 | Protz, Jr. | 362/396 |
| 5,642,819 A * | 7/1997 | Ronia | 211/86.01 |
| 5,697,591 A | 12/1997 | Cooper | |
| 5,772,166 A * | 6/1998 | Adams | 248/231.81 |
| 5,794,384 A | 8/1998 | Dean et al. | |
| 5,871,306 A | 2/1999 | Tilcox | |
| 5,893,239 A | 4/1999 | Leahy | |
| 6,109,765 A * | 8/2000 | Blanton | 362/249.16 |
| 6,206,613 B1 | 3/2001 | Elkins | |
| 6,247,205 B1 * | 6/2001 | Damadian et al. | 24/3.12 |
| 6,338,460 B1 * | 1/2002 | Rumpel | 248/229.16 |
| 6,494,411 B1 * | 12/2002 | Bjorklund | 248/49 |
| 6,513,772 B2 * | 2/2003 | Gary et al. | 248/231.91 |
| 6,619,596 B1 | 9/2003 | Caine et al. | |
| 6,663,069 B1 * | 12/2003 | Norberg | 248/316.7 |
| 6,799,744 B1 * | 10/2004 | Koistinen | 248/227.3 |
| 7,059,749 B1 | 6/2006 | Bernier | |
| 7,188,977 B1 * | 3/2007 | Lough | 362/396 |
| 7,341,230 B2 | 3/2008 | Beaudry | |
| 7,578,486 B1 * | 8/2009 | Taylor | 248/75 |
| 7,621,486 B1 | 11/2009 | Barrepski | |
| 8,020,825 B2 * | 9/2011 | Dostaler et al. | 248/316.7 |
| 8,272,613 B2 * | 9/2012 | Golle et al. | 248/316.7 |
| 8,356,778 B2 | 1/2013 | Birli et al. | |
| 8,360,378 B1 | 1/2013 | Owens | |
| 2005/0160681 A1 | 7/2005 | Boelling | |
| 2008/0011907 A1 * | 1/2008 | Jacobsma | 248/62 |
| 2008/0078793 A1 * | 4/2008 | Brown | 224/483 |
| 2010/0001152 A1 * | 1/2010 | Golle et al. | 248/220.21 |
| 2010/0118554 A1 * | 5/2010 | Kraus et al. | 362/396 |
| 2010/0193655 A1 * | 8/2010 | Fleischman | 248/316.7 |
| 2011/0108150 A1 | 5/2011 | Renaud | |
| 2013/0086777 A1 | 4/2013 | McLaughlin et al. | |
| 2013/0333197 A1 * | 12/2013 | Schulte et al. | 29/525.08 |

OTHER PUBLICATIONS

Office Action issued Dec. 4, 2014 in U.S. Appl. No. 14/298,429 by Gibbons.

* cited by examiner

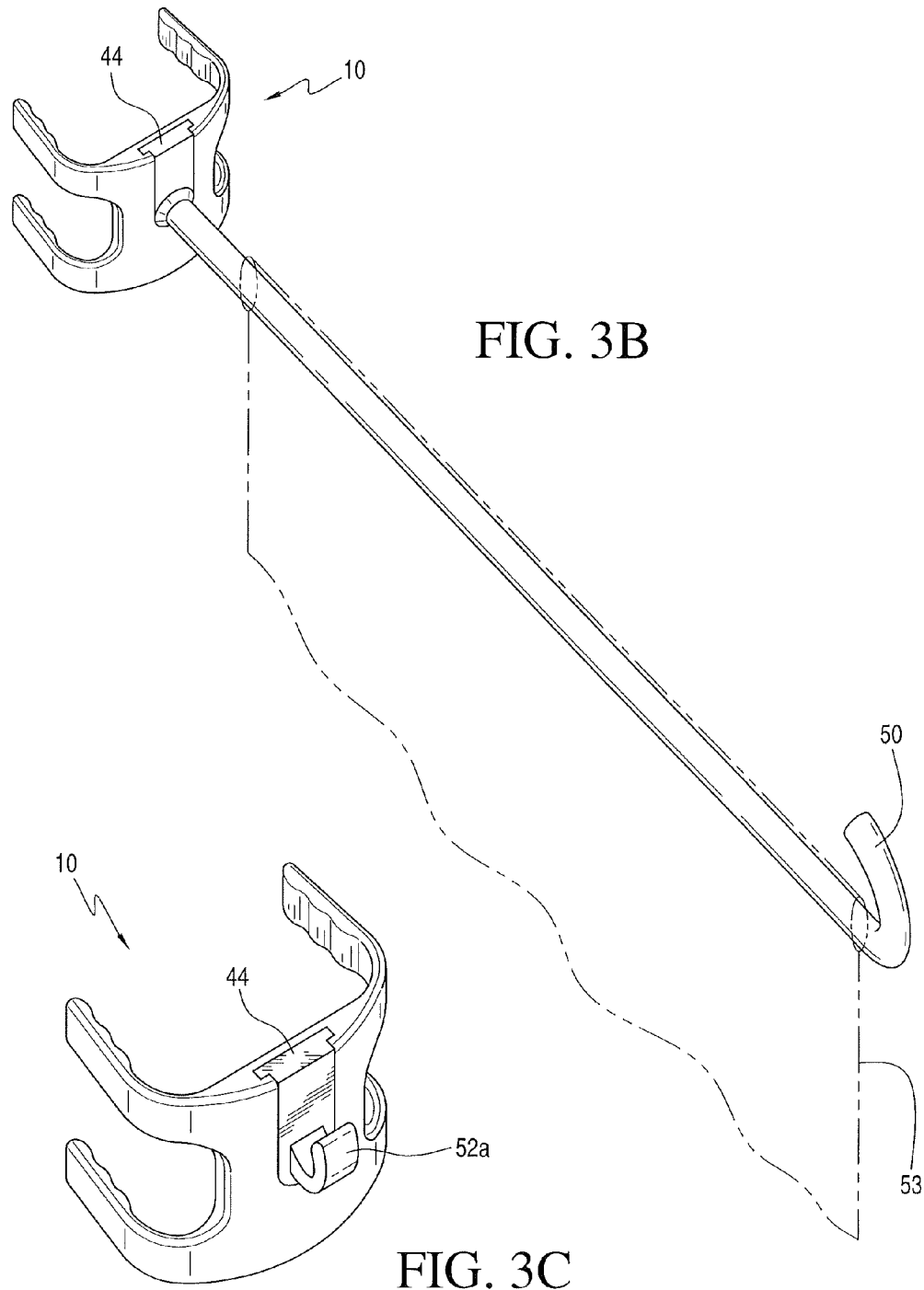

MOUNTING CLIPS AND DECORATIVE MOUNTING ARTICLES

CROSS-REFERENCE TO RELATED APPLICATION

This application claims priority under 35 USC 119(e) from U.S. Ser. No. 61/489,353, filed May 24, 2011.

BACKGROUND

1. Field of the Invention

The field of the present invention relates to mounting clips and decorative mounting articles configured to mount onto a rain gutter downspout or other comparable mounting surface.

2. Background

Homeowners frequently mount various types of items onto the exterior of a building structure, including security lights, decorative lights, flags, and seasonal decorations. Many times, however, these items are not easily mounted onto building exteriors. Security lights, for example, are usually mounted onto exterior corners of buildings, using screws and specially designed mounting brackets. Decorative lights are often mounted with hook-type attachments, which are nailed or screwed into the building exterior or joined to horizontally disposed rain gutters. Flag mounts and other types of seasonal decorations are similarly mounted to building exteriors, using special attachments which are screwed or nailed into place.

Unfortunately, when lights, flags, decorations, and other mountable elements are not in use, the mounting devices used to attach these lights and decorations are left behind, potentially decreasing the aesthetic value of the building. In addition, when these mounting devices and their respective fastening elements are removed, damage made during installation is revealed. Depending on the material of the building structure, after removal of these elements, scratches, holes, cracks, rips, and tears in building exteriors are apparent. Besides negatively affecting the aesthetic appearance of building exteriors, the resulting damage may also provide entry sites for insects, water, wind, and dirt.

Various types of solutions have been proposed to attach lights, flags, decorations and other types of mountable elements to building exteriors. However, few solutions allow for attachment to a building structure without penetrating the structure's exterior. Moreover, few, if any, of these proposed solutions have considering attaching mountable elements, such as lights and decorations to rain gutter downspouts and other comparable vertically disposed mounting surfaces.

Downspouts, which are also commonly known as waterspouts, down pipes, drain spouts, and drain pipes, are vertically positioned conduits which are coupled to horizontally positioned gutters to carrying rainwater from a gutter to ground level. Downspouts primarily direct water away from a building's foundation. By using downspouts, water may be directed to a sewer, rain collection area, or to the ground at a distance from a building foundation. Downspouts generally are positioned vertically against exterior building walls, and typically are coupled to building exteriors using straps positioned at various points along the vertical length of the downspout. Although some proposed solutions have considered clip-type attachments for decorative lights to horizontally-positioned gutters disposed along a roofline, these attachments are not adaptable to the shape and configuration of downspouts and other comparable vertically disposed mounting surfaces.

For these reasons, among others, there is a clear need for improved mounting clips used to mount lights, decorations, and other types of mountable elements. Moreover, a need exists for decorative mounting articles that may be attached to downspout and comparable vertically disposed mounting surfaces without the use of fastening elements. More particularly, a need exists for mounting clips that may be installed and removed repeatedly without causing significant harm to the supporting structure. The present invention fulfills these needs and provides further related advantages, as described in the following summary.

SUMMARY

In one aspect of the invention, a mounting clip is configured for attachment to a downspout or other comparable mounting surface. The mounting clip includes a frame having a plurality of extending arms and a central portion disposed between at least two of the plurality of extending arms.

In one mounting clip configuration, a blank receiving area, configured to mate with a blank, is defined in the central portion. Various types of mountable elements may be coupled to the blank, including hooks, clips, arms, and mounting plates. The extending arms, central portions and/or rear portions of the frame may include projections and channels, which are complimentary to the mounting surface such that the clip engages with the surface without the need for fastening elements.

In another aspect of the invention, a decorative mounting article includes a mounting channel having sidewall with engagement portions. Each engagement portion similarly includes projections and channels configured to engage with a mounting surface without the use of fastening elements.

A more complete understanding of the invention, including an understanding of the various configurations of mounting clips and decorative mounting articles, will be afforded to those skilled in the art, as well as a realization of additional advantages and objects thereof, by consideration of the following detailed description. Reference will be made to the appended sheets which will first be described briefly.

BRIEF DESCRIPTION OF THE DRAWINGS

The drawings described herein are for illustrative purposes only and are not intended to limit the scope of the present disclosure. In the drawings, wherein like reference numerals refer to similar components:

FIG. 3B is a right perspective view of an alternative embodiment of the first configuration of a mounting clip with a blank therein, wherein said blank is coupled to a flag or banner attachment;

FIG. 3C is a right perspective view of another alternative embodiment of the first configuration of a mounting clip with a blank therein, wherein said blank is coupled to a hook attachment;

DETAILED DESCRIPTION

Figure 13A:
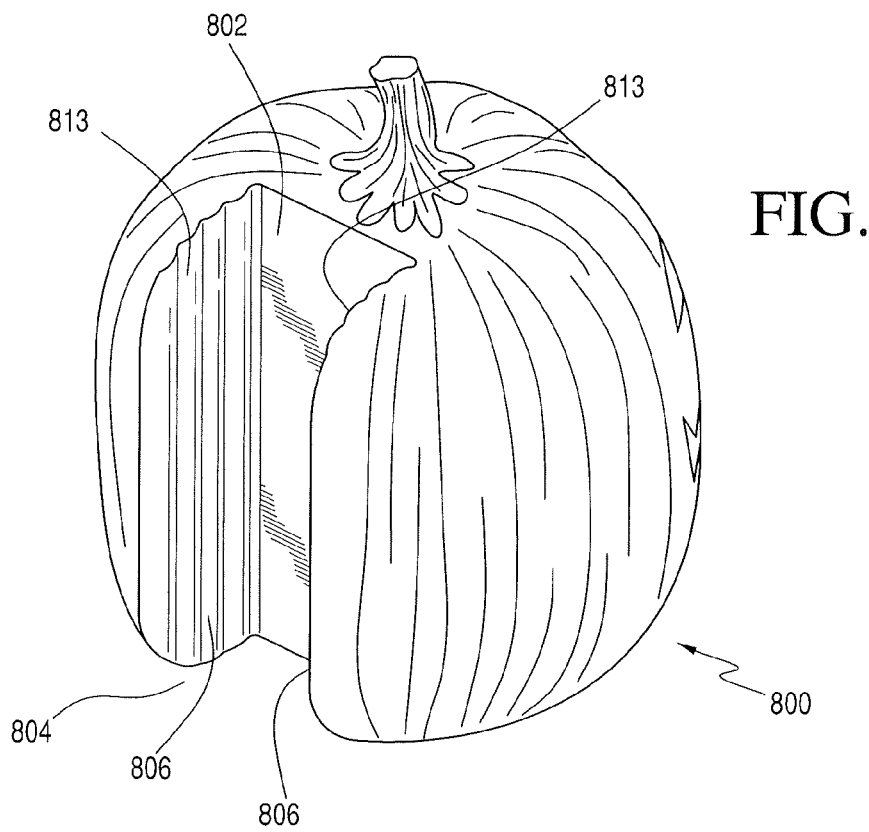
FIG. 13A is a rear perspective view of a decorative element, defining a channel, configured to mount with a downspout or other comparable mounting surface.
Figure 13B:
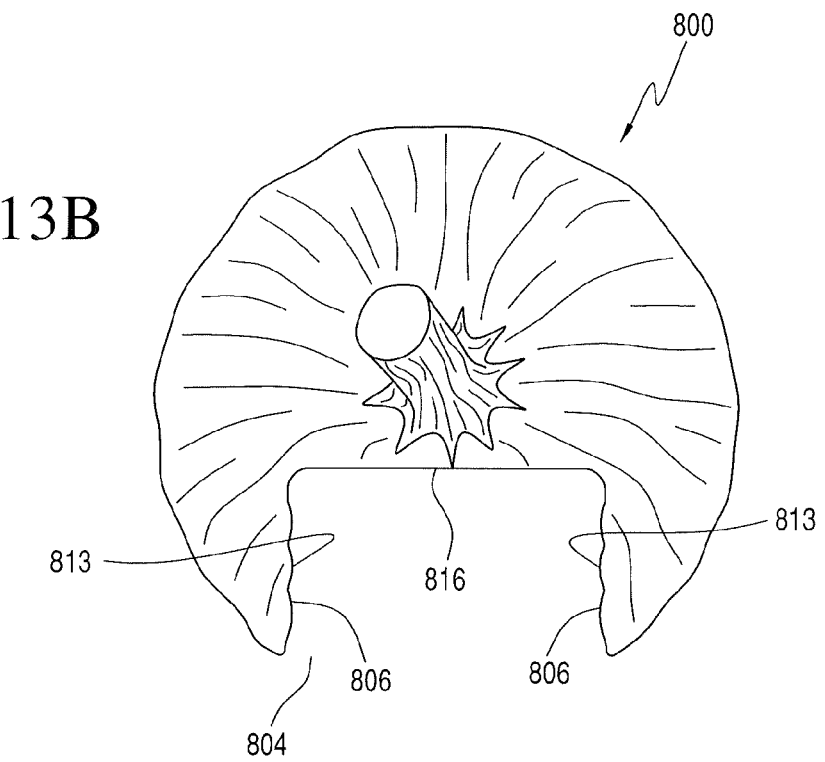
FIG. 13B is a top view of the decorative element shown in FIG. 13A.

Turning in detail to the drawings, FIGS. 1-12 show various configurations of mounting clips 10, 100, 200, 300, 400, 500, 600, 700. FIGS. 13A and 13B show one configuration of a decorative mounting article 800. The mounting clips and decorative mounting articles described herein are configured for mounting onto a downspout or other comparable vertically disposed mounting surface. As used herein, the term "downspout" should be broadly construed as any conduit that may couple to a roof gutter or drainage system on a building structure. Moreover, as used herein, the term "building structure" should be construed broadly as any structure having walls suitable for installation of a downspout or comparable vertically disposed mounting surface. Such structures are therefore not limited to stationary building structures, but may also include boats, mobile homes, and recreational vehicles, which may be suitable for habitation.

It is also within the scope of this invention for the mounting clips and decorative mounting articles to be mounted on alternative mounting surfaces other than vertically disposed mounting surfaces. Alternative mounting surfaces may comprise, for example and without limitation, hand railings, deck railings, porch railings, whether horizontally disposed or angularly disposed.

The mounting clips and decorative mounting articles shown may be manufactured from a variety of material types. However, in preferred configurations, the clips and article are manufactured with flexible materials, including, but not limited to elastomeric, thermoplastic, and metallic materials. A representative metal is aluminum. Representative thermoplastic materials are polyvinylchloride (PVC) and polyurethane. A representative elastomeric material is rubber or latex rubber. Such materials should be substantially weather resistant such that they are not subject to significant corrosion upon frequent exposure to rain, snow, ice, humidity, etc. Alternatively, the materials may be impregnated with or coated with protective materials, such as but not limited to antimicrobials, UV-resistants and/or flame retardants, that provide sufficient weather resistance.

Mounting clips and decorative mounting articles may also be manufactured with different types of colors such that they blend with the building structure or downspout material. Alternatively, mounting clips and decorative mounting articles may be manufactured having a contrasting color, decoration, or pattern that lends to building aesthetics or seasonal décor. For example, mounting clips may have a shape and color that changes the appearance of a downspout to appear from a distance to be a striped candy cane. In addition, mounting clips and decorative mounting articles may have shapes and colors that are complementary to other décor positioned close to the building structure.

Figure 1:
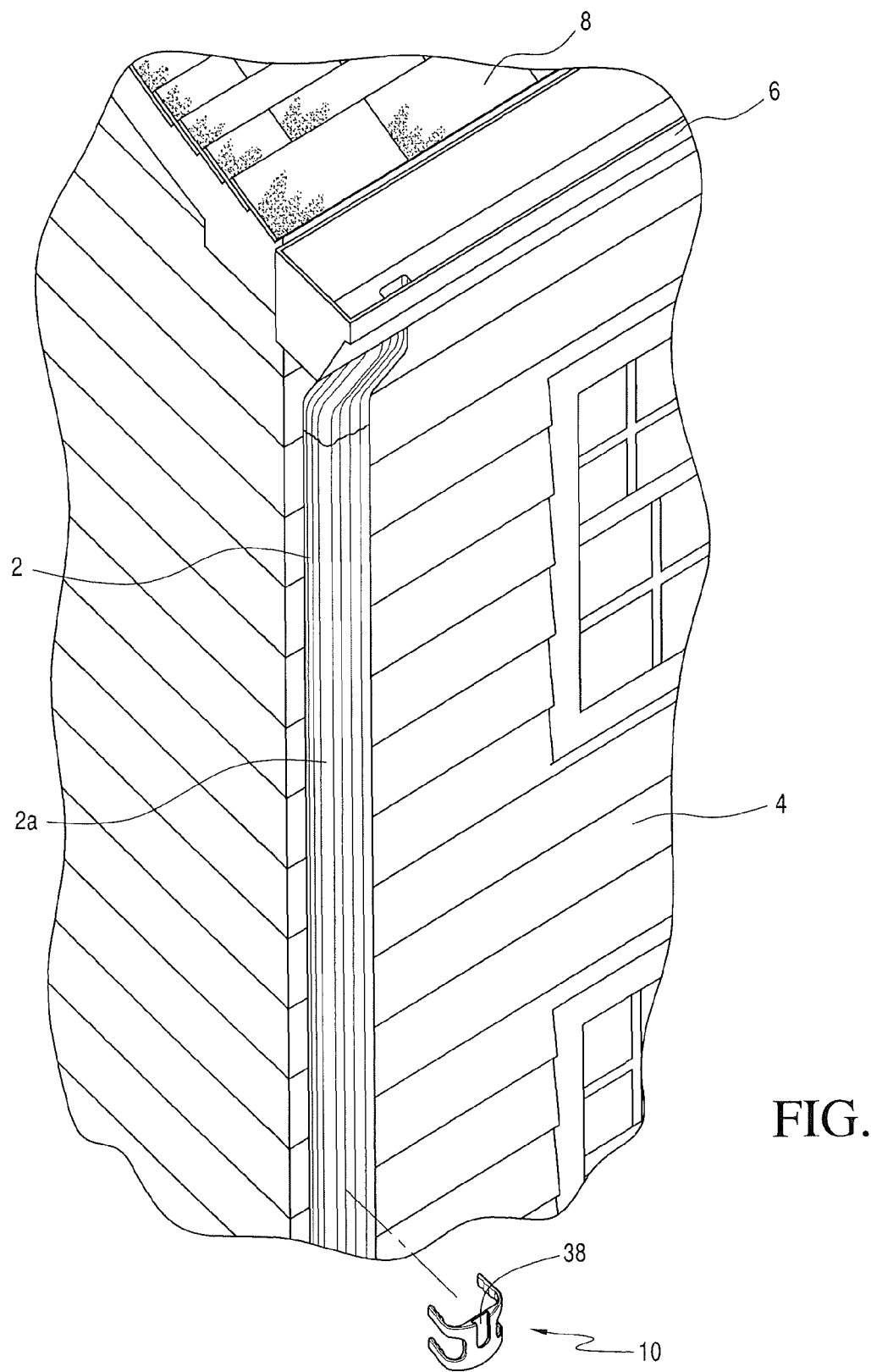
FIG. 1 is right perspective view of one configuration of a mounting clip positioned for alignment onto a downspout.
Figures 2, 3A:
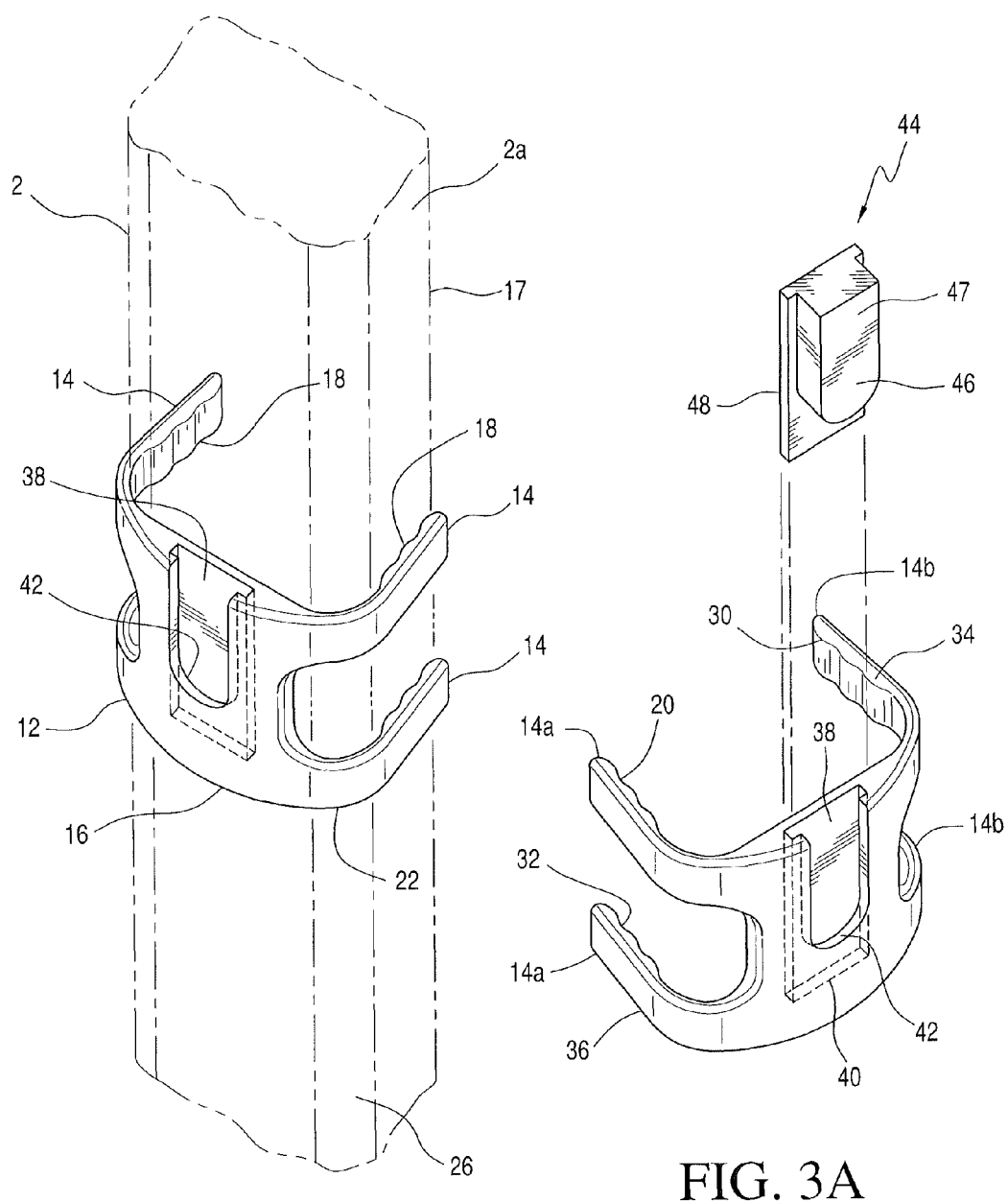
FIG. 2 is a left perspective view of the mounting clip shown in FIG. 1.
FIG. 3A is a right perspective view of the mounting clip shown in FIG. 1 and a blank positioned in alignment with a blank receiving area on the clip.

FIGS. 1-3C, and 12 show one version of a mounting clip 10 configured for attachment to a mounting surface 2, such as a downspout 2a, a post 2b (FIG. 12), or other comparable mounting surface. The downspout 2a is in a substantially vertical position against a building structure 4 and may be coupled to a horizontally positioned gutter 6, which is coupled to a roof 8 of the building structure. Referring particularly to FIGS. 2 and 3A, in one configuration, the mounting clip 10 includes a frame 12 having a plurality of extending arms 14 and a central portion 16 disposed between at least two of the plurality of extending arms. The frame 12 has a shape that is complimentary to a profiled mounting surface 17, which is represented in hidden lines in FIG. 2. A "profiled mounting surface" is defined herein as a surface that engages with complementary engagement portions of a mounting clip or a decorative mounting article, as further described below.

Where the mounting surface 2 is a downspout that has a generally rectangular cross-section with rounded corners, the frame 12 may be substantially u-shaped such that it covers front sections and side sections of the downspout. If the mounting surface, such as a downspout, has a generally circular cross-section, however, the frame may be substantially c-shaped. Other complementary frame configurations may also be realized, depending upon the cross-sectional shape of the mounting surface.

In the configuration shown in FIGS. 1, 2 and 3A, the mounting clip 10 includes at least two extending arms 14 each having an engagement portion 18 with a profiled inner section 20. The clip 10 also includes a corner section 22 that engages with the corners 26 of the mounting surface 2, while the profiled inner section 20 is configured to engage with a profiled mounting surface 17. The profiled inner section 20 of the extending arm also may include projections 30 and channels 32 that extend from an upper arm edge 34 to a lower arm edge 36.

Opposing extending arms 14a, 14b may be slightly tapered toward one another such that upon installation onto a mounting surface 2, the arms 14a, 14b are pulled apart. During installation, extending arms 14a, 14b may then be released and positioned such that projections 30 and channels 32 of the profiled inner section 20 are in substantial alignment with the profiled mounting surface 17. Thus, when the mounting clip 10 is installed on a downspout, projections 30 fit within or engage recesses or channels of the profiled mounting surface 17, and ridges or raised portions of the profiled mounting surface 17 fit within or engage with channels 32 such that the clip is held onto the surface without the use of fastening elements, such as tape, nails, and screws, or the like. The engagement of the profiled sections 20 of the clip 10 and the mounting surface 17 is such that the clip 10 may be quickly installed onto the mounting surface by pushing force, and then in turn quickly removed by pulling the extending arms away from the mounting surface 17. When the clip 10 is mounted on the mounting surface 17, the extending arms 14a, 14b provide sufficient force to hold the clip in place and to support various types of mountable elements 19, including decorations, flag poles, and lights, as further described below. The engagement of the clip 10 to the mounting surface 17 is a snap fit or comparable to a snap fit, and the clip 10 may be installed and removed repeatedly from its engagement to the mounting surface 17.

In the configuration shown in FIGS. 1-3C, the central portion 16 includes a blank receiving area 38, having a varying wall thickness, with at least one wall thickness portion having a greater wall thickness than the extending arm wall thickness. The blank receiving area 38 defines a slotted area 40, having one section with a substantially rectangular shape, and a blank opening area 42. The shapes of the slotted area and the blank opening area shown in FIGS. 1-3C, however, should not be construed as limiting. Each of these areas 40, 42 may have any shape that facilitates mating with a blank 44. Mating may occur by slidable engagement, snap engagement, lock and key type arrangements, male and female arrangements, and/or any other engagement method used alone or in combination that allows for mounting of the blank onto the mounting clip.

In the configuration of FIGS. 1-3C, the blank 44 includes a protruding section 46 and a mating section 48. The mating section 48 is configured for positioning within the slotted area 40 such that the blank 44 slides into the blank receiving area 38. The protruding section 46 includes a face portion 47, which is configured for coupling with various types of mountable elements.

Figure 10:
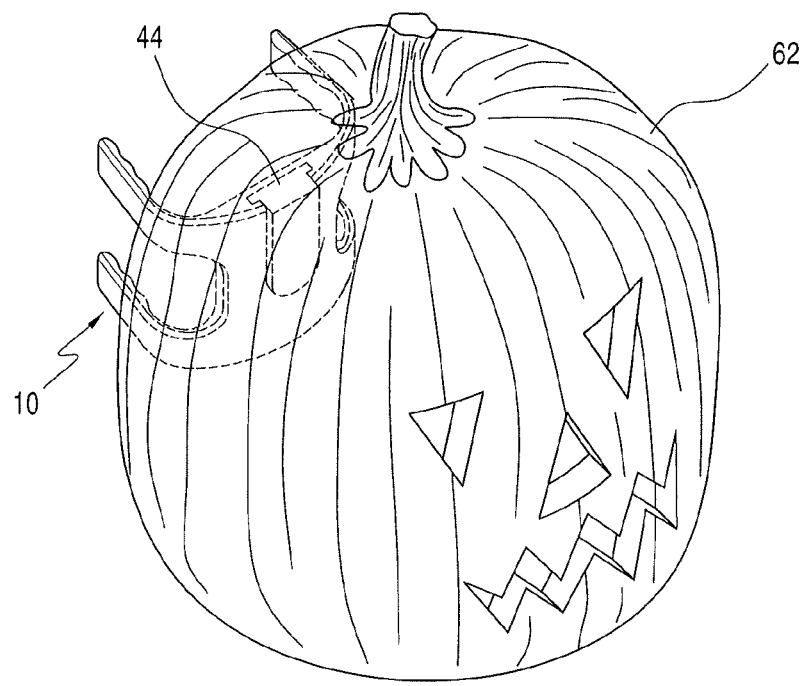
FIG. 10 is a right perspective view of a decorative article coupled to a mounting clip.

Mountable elements include, but are not limited to, arm attachments 50 (FIG. 3B), hook attachments 52a (FIGS. 3C, 12), 52b (FIG. 4B), 52c (FIG. 8), clip attachments 54 (FIGS. 4A, 5, 6), plate or bracket attachments 56 (FIG. 7), and decorative articles 700 (FIG. 10). These types of mountable elements 19 allow a user to position flags or banners 53 (FIG. 3B), string lights, security lights, birdhouses, decorative lights, decorative articles, electrical outlets, and any other product type suitable for mounting. In alternative configurations, these types of mountable elements may be integral to the central portion, as shown particularly in FIGS. 4A, 6, and 11. Alternatively, hooks, clips, mounting plates, and similar devices may directly attached to a central portion on one or clips, using fastening elements such as adhesives, tapes, and screws. See, e.g. FIG. 7. The central potion 16 of the clip 10 is preferably used as an attachment point for one or more mountable elements. As such, a mountable element may be coupled to the central portion using any viable method. Such methods include use of molding techniques, adhesives, fasteners 58 (FIG. 7), and other types of fastening elements.

Figure 4A:
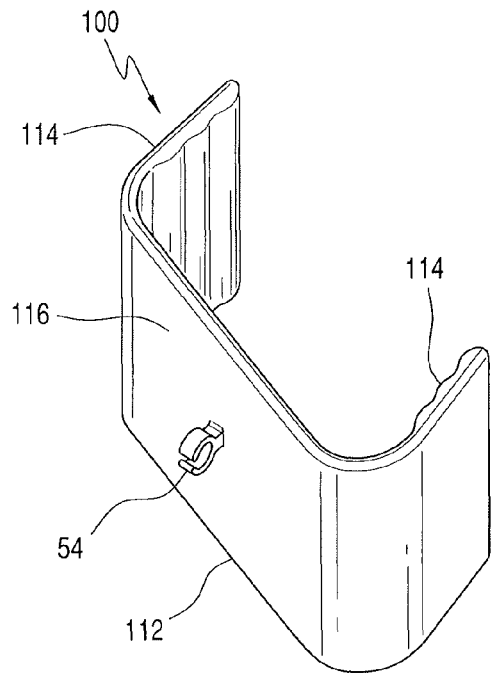
FIG. 4A is a right perspective view of a second configuration of a mounting clip.
Figure 5:
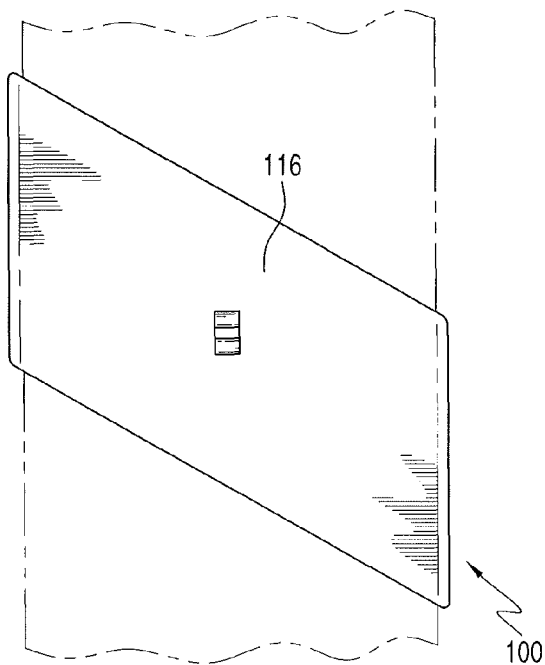
FIG. 5 is a front view of the mounting clip configuration shown in FIG. 4.
Figure 4B:
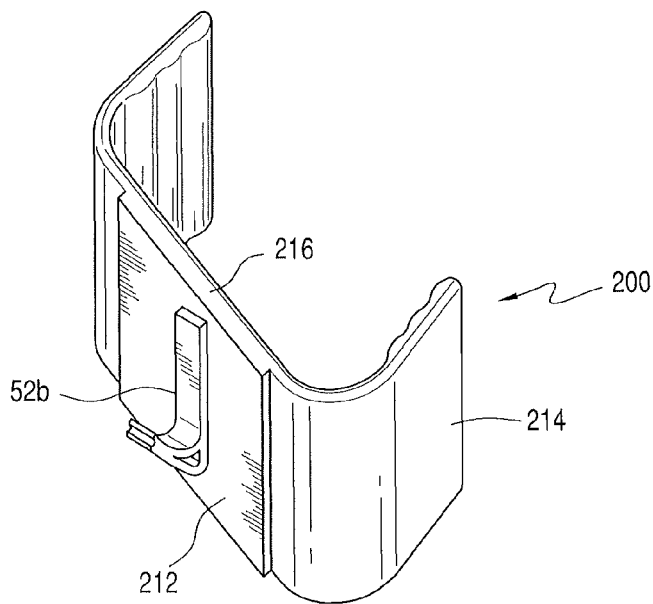
FIG. 4B is a right perspective view of a third configuration of a mounting clip.

FIGS. 4A, 4B, and 5 show other configurations of a mounting clip 100, 200 that may attach to a mounting surface 2. Here, each mounting clip includes a frame 112, 212 having two extending arms 114, 214 and an angularly aligned or slanted central portion 116, 216 disposed between the extending arms. When multiple mounting clips of this configuration are coupled to a downspout, the downspout may have a striped appearance when viewed from a distance. For example, where the downspout is white and the clips 100, 200 are red, from a distance, the downspout may look like a candy cane. This type of configuration is therefore, particularly suitable for use as a decorative element during the Christmas holidays. FIGS. 4A and 5 show a clip-type attachment 54 which may be used to string lights, garland, ropes, cords, etc. FIG. 4B shows an alligator hook-type attachment 52b, which may also be used to hang lights, garland, ropes, cords, and similar objects.

Figure 6:
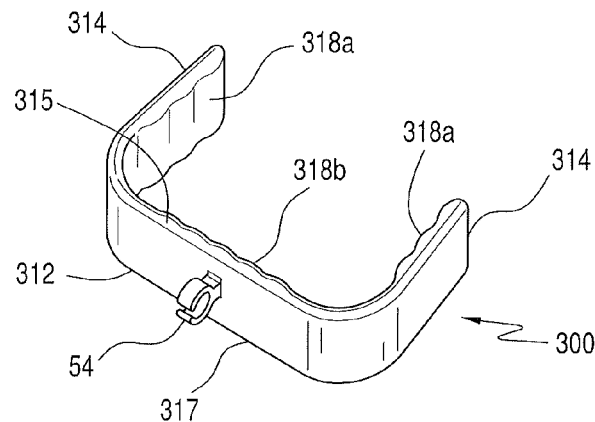
FIG. 6 is a right perspective view of a fourth configuration of a mounting clip.

FIG. 6 shows one configuration of a mounting clip 300, having a horizontally positioned central portion 316 and extending arms 314. Here, the central portion of the clip includes an arm engagement portion 318a and a central engagement portion 318b. The central engagement portion extends from an upper face 315 to the lower face 317 of the central portion 316. These engagement portions 318a, 318b provide additional means of retaining the clip 300 onto a mounting surface.

Figure 7:
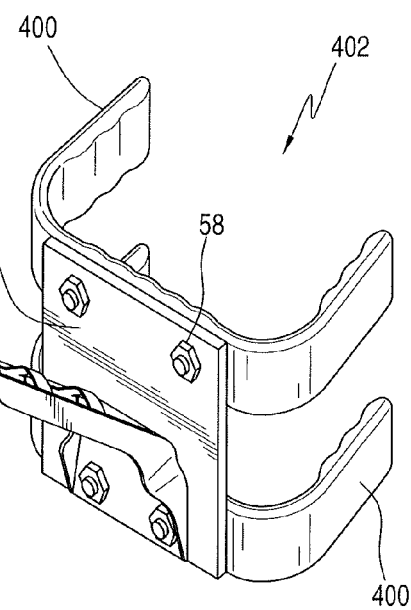
FIG. 7 is a right perspective view of a mounting clip assembly.

FIG. 7 shows an example of one method of coupling mounting clips 400 to form a mounting clip assembly 402, using a plate or bracket 56. This type of attachment may be used to couple other types of mountable elements such as a flag holder 60, security light brackets, etc., which are normally directly mounted onto vertical surfaces of building structures.

Figure 8:
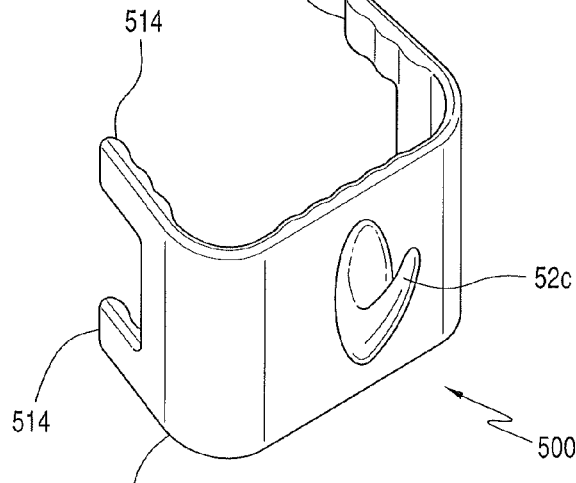
FIG. 8 is a right perspective view of a fifth configuration of a mounting clip.
Figure 9A:
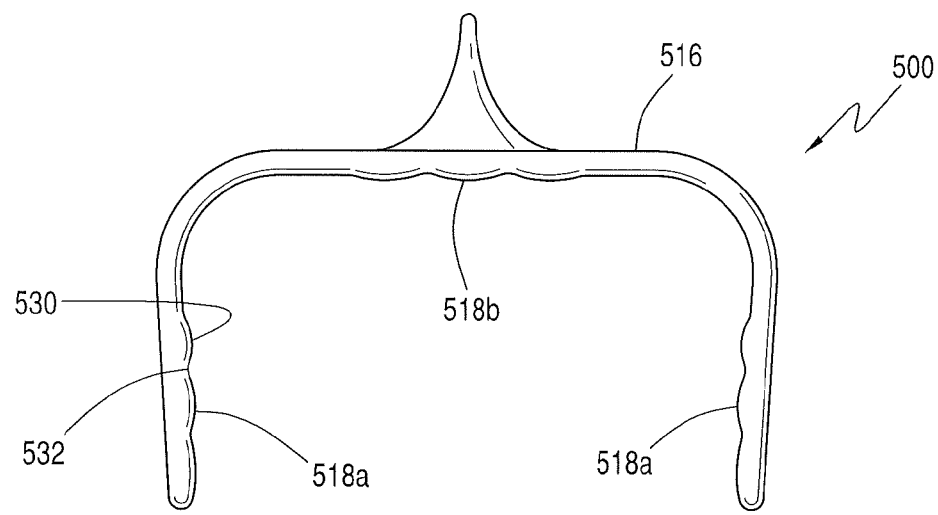
FIG. 9A is a top view of a mounting clip configuration shown in FIG. 8.
Figure 9B:
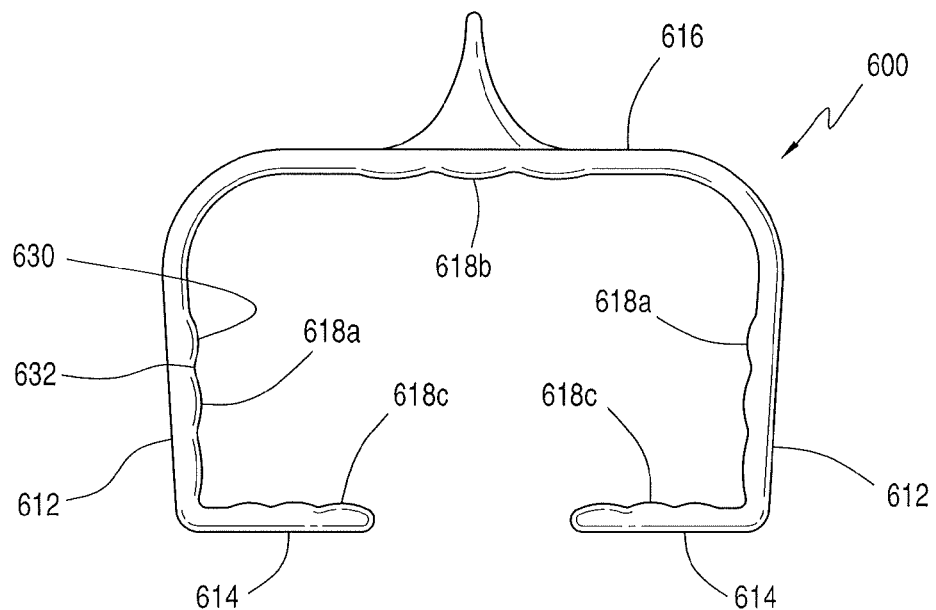
FIG. 9B is a top view of an sixth mounting clip configuration.

FIGS. 8, 9A, and 9B show additional configurations of mounting clips 500, 600. Here, each mounting clip includes a frame 512, 612 having four extending arms 514, 614 and horizontally positioned central portion 516, 616 disposed between the extending arms with engagement portions 518a, 618a. FIGS. 8 and 9A show engagement portions 518a, 518b disposed on profiled inner sections on the extending arm and the central portion. In FIG. 9B, each extending arm 614 is configured to extend around a rear portion of a mounting surface (not shown). As such, this version of the mounting clip 600 includes rear engagement portions 618c. Each engagement portion has projections 530, 630, respectively, separated by channels 532, 632, which facilitate attachment of the mounting clip 500, 600 to a mounting surface.

FIG. 10 shows another configuration of a decorative article 62 suitable for attachment to a mounting clip 10. In FIG. 10, the rear of the decorative article is coupled to a blank 44. Alternatively, a blank may be formed integrally to extend from a surface of a decorative article. Although a pumpkin is shown as the decorative article in this example, any type of decorative article or element may be coupled to the blank 44 or may have a blank integrally formed therein. Other examples of decorative articles include mountable stars, hearts, icicles, snow men, candy canes, reindeer, santa clauses, angels, stuffed animals, etc.

Figure 11:
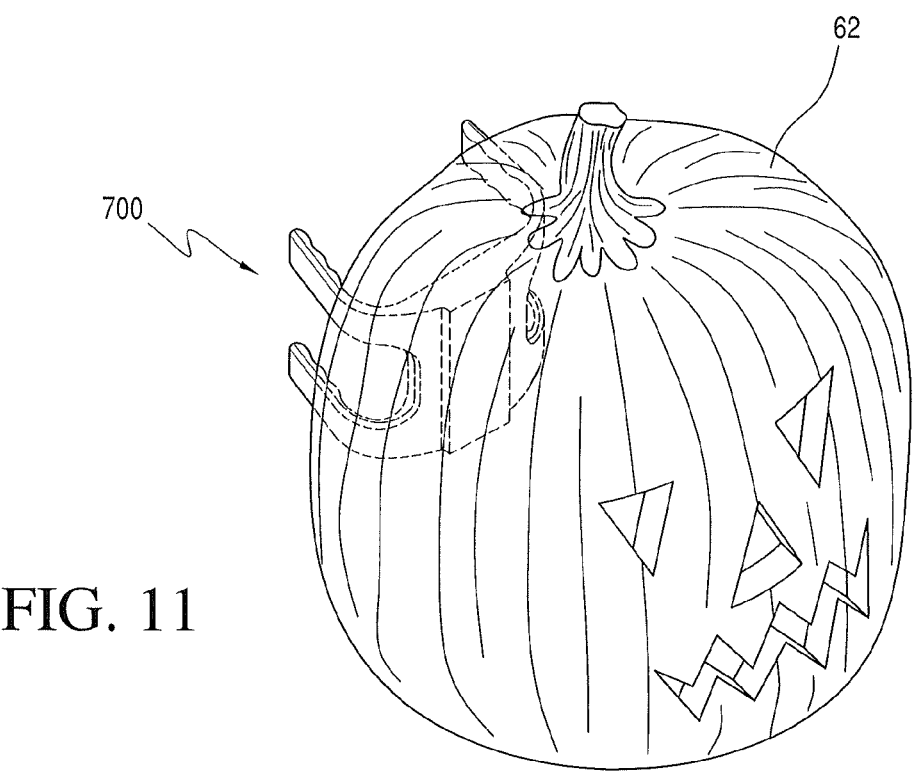
FIG. 11 is a right perspective view of a decorative article having an integrated mounting clip.
Figure 12:
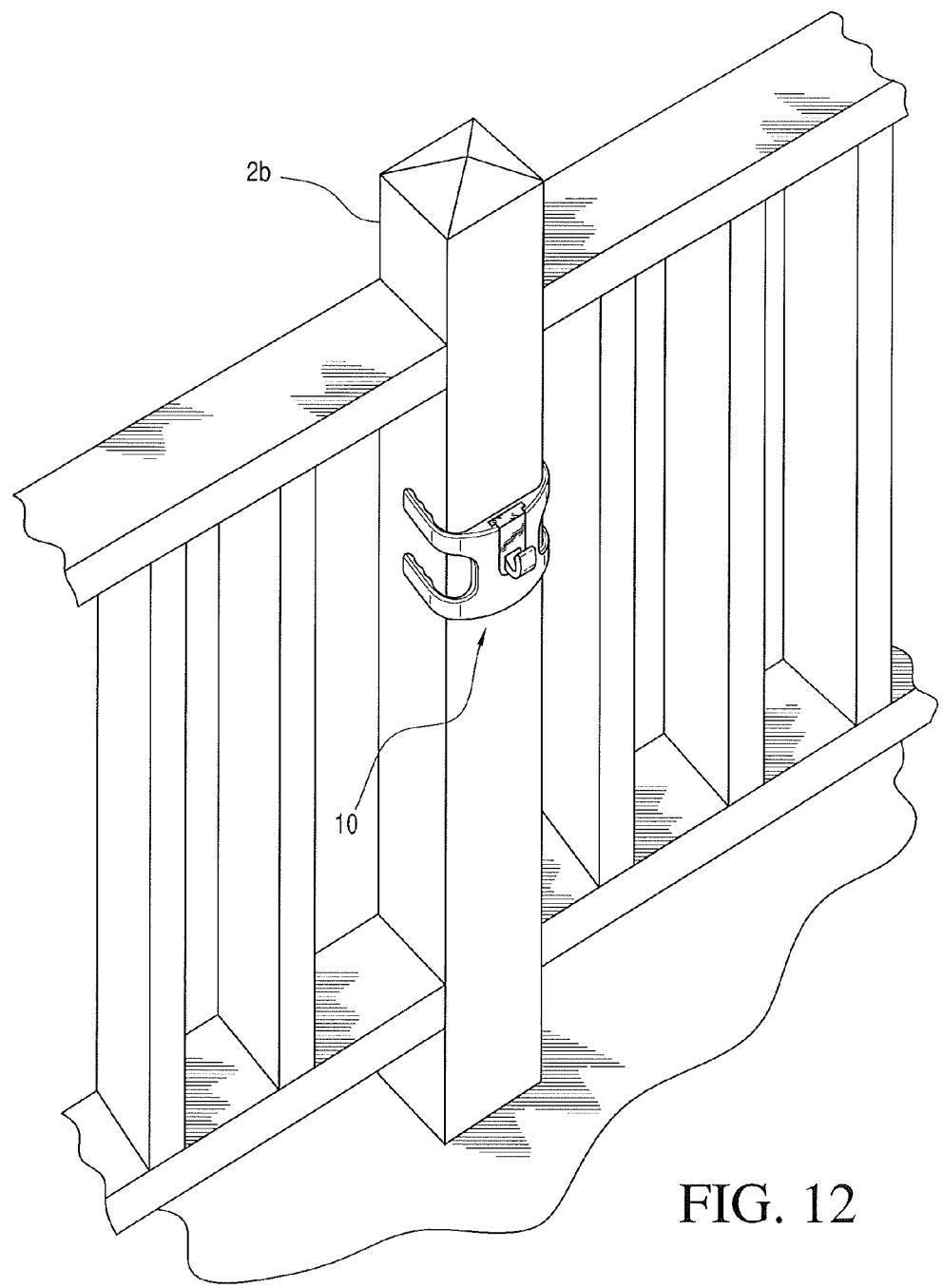
FIG. 12 is a perspective view of one mounting clip configuration mounted onto a vertical post.

FIG. 11 shows a mounting article 700 integrally formed with the decorative article 62, using any viable technique. Such techniques include, but are not limited to, molding and machining.

FIG. 13 shows one configuration of a decorative mounting article 800, having a mounting channel 802, defined within a section 804 of the decorative mounting article. The channel includes sidewalls 806 having engagement portions 813. The engagement portions may comprise projections or ridges separated by channels or troughs to engage complementary ridges and troughs of a mounting structure, such as a downspout. A central portion 816 of the mounting article optionally may include engagement portions (not shown in FIG. 13).

The mounting clips and decorative mounting articles shown include engagement portions having shapes, which may be complementary to various types of profiled mounting surfaces. In preferred configurations, extending arms, central portions, and/or rear portions each include respective engagement portions having projections and channels. These respective engagement portions are configured to engage with profiled mounting surfaces such that mounting clips and decorative element may be coupled to mounting surfaces without the use of other fastening elements.

Thus, various configurations of mounting clips and decorative mounting articles are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A mounting clip, comprising:
a frame configured to mount onto a mounting surface, the frame having:
a first pair of extending arms spaced apart from one another a first distance and each defining an axis with said axes substantially parallel to one another, wherein a first extending arm of the first pair of extending arms has a first engagement portion comprising a plurality of projections separated by channels, wherein a second extending arm of the first pair of extending arms has a second engagement portion comprising a plurality of projections separated by channels, and wherein the projections of the first engagement portion extend in a direction toward the projections of the second engagement portion;
a second pair of extending arms spaced apart from one another; and
a central portion disposed between the extending arms of the first pair of extending arms and the extending arms of the second pair of extending arms, said central portion having a face surface with length substantially the same or the same as the first distance and having a height;
wherein the central portion defines a blank receiving area formed as a channel adapted for a blank to slidably engage therein, said channel having a channel opening facing upwardly in a direction substantially perpendicular to the axes of the extending arms and having a channel width that is shorter than the length of the central portion face and having a channel height that is shorter than the height of the central portion face.

2. The mounting clip of claim 1, wherein the blank receiving area is configured to mate with a decorative article.

3. The mounting clip of claim 2, further comprising a blank positioned within the blank receiving area.

4. The mounting clip of claim 3, wherein a hook attachment is coupled to the blank.

5. The mounting clip of claim 3, wherein a flag attachment is coupled to the blank.

6. The mounting clip of claim 1, wherein a clip attachment is coupled to the central portion.

7. The mounting clip of claim 1, wherein a hook attachment is coupled to the central portion.

8. The mounting clip of claim 1, wherein the central portion is angularly aligned.

9. A method for mounting a decorative or functional article, comprising:
engaging a mounting clip to a mounting surface, said mounting clip comprising a frame configured to mount onto the mounting surface, the frame having: (a) a first pair of extending arms spaced apart from one another a first distance and each defining an axis with said axes substantially parallel to one another, wherein a first extending arm of the first pair of extending arms has a first engagement portion comprising a plurality of projections separated by channels, wherein a second extending arm of the first pair of extending arms has a second engagement portion comprising a plurality of projections separated by channels, and wherein the projections of the first engagement portion extend in a direction toward the projections of the second engagement portion, (b) a second pair of extending arms spaced apart from one another, and (c) a central portion disposed between the extending arms of the first pair of extending arms and the second pair of extending arms, said central portion having a face surface with length substantially the same or the same as the first distance and having a height, and wherein the central portion defines a blank receiving area formed as a channel with a channel opening facing upwardly in a direction substantially perpendicular to the axes of the first pair of extending arms and adapted for a blank to slidably engage therein, said channel having a channel width that is shorter than the length of the central portion face and a channel height that is shorter than the height of the central portion face; and
engaging a blank with the blank receiving area, with said decorative or functional article mounted to said blank or said blank integrally formed in said decorative or functional article.

10. The mounting clip of claim 1, wherein at least some of the projections of the first extending arm have curved upper surfaces.

11. The mounting clip of claim 1, wherein at least some of the projections of the second extending arm have curved upper surfaces.

12. The mounting clip of claim 1, wherein at least some of the channels of the first extending arm are concavely curved.

13. The mounting clip of claim 1, wherein at least some of the channels of the second extending arm are concavely curved.

* * * * *